United States Patent [19]
Martin et al.

[11] Patent Number: 5,903,828
[45] Date of Patent: May 11, 1999

[54] PERSONAL HANDYPHONE SYSTEM HARDWARE CHECKING OF SA-FIELD

[75] Inventors: Varenka Martin; Denis Archambaud, both of Antibes; Patrick Feyfant, Toulon; Philippe Gaglione, Mandelieu; Satoshi Yoshida, Nice; Laurent Winckel; Oliver Weigelt, both of Antibes, all of France

[73] Assignee: VLSI Technology, Inc., San Jose, Calif.

[21] Appl. No.: 08/902,189

[22] Filed: Jul. 29, 1997

[51] Int. Cl.$^6$ ...................................................... H04B 1/16
[52] U.S. Cl. .......................... 455/343; 455/574; 455/575; 370/311
[58] Field of Search .................................. 455/343, 38.3, 455/127, 575, 550, 73, 574, 572, 426, 553, 552; 370/311

[56] References Cited

U.S. PATENT DOCUMENTS 5,278,831   1/1994   Mabey et al. ............................ 455/343

OTHER PUBLICATIONS

"Personal Handy Phone System Arib Standard Version 2 RCR STD–28", *Association of Radio Industries and Businesses (ARIB)*, Introduction, Table of Contents, pp. 1–177 and 481–487 (Dec. 26, 1995).

*Primary Examiner*—Doris H. To

[57] ABSTRACT

A circuit arrangement for hardware checking the validity of data transmitted in a SA-field within the traffic channel of the personal handyphone system. The circuit arrangement includes a receiver for receiving control information corresponding to a SA-field, and an interrupt generator for generating an interrupt to activate the handset processor when the control information indicates the SA-field is the beginning of a series of SA-fields containing valid data.

16 Claims, 3 Drawing Sheets

| FIRST BIT OF PRIOR SA-FIELD | FIRST BIT OF PRESENT SA-FIELD | STATUS OF DATA IN PRESENT SA-FIELD |
|---|---|---|
| 0 | 0 | VALID |
| 0 | 1 | VALID |
| 1 | 0 | VALID |
| 1 | 1 | INVALID |

PERSONAL HANDYPHONE SYSTEM HARDWARE CHECKING OF SA-FIELD

BACKGROUND OF THE INVENTION

The present invention relates to an apparatus and method for checking data transmitted in a Personal Handyphone System (PHS), and in particular, to an apparatus and method for reducing power consumption by a PHS module when checking transmitted data.

Cellular telephone communications systems allow users to communicate via portable stations or handsets without the use of a wire or cable connection. Voice and data is transmitted in cellular telephone technology through radio waves at a particular frequency. By eliminating the need for a hard-wire connection, cellular telephones can be used, for example, in a car or on an airplane. The increased use of cellular telephones in recent years is due in large part to this mobile feature.

There are various cellular telephone services under which cellular telephones operate. One system is the Personal Handyphone System (PHS). The PHS is a high capacity fully digital mobile cellular telephone service that was originally launched in Japan in 1995. Like other cellular telephone services, the PHS has its own operation standard governing the use of radio facilities and equipment that transmit over radio waves within the system.

A desirable feature for any cellular telephone is a handset that is sized to allow it to be easily managed and transported. For example, it is preferable to provide a handset with an overall size that can be carried in a handbag, such as a purse, or a pocket of a jacket.

One of the components of a handset that significantly affects the overall size of the handset is the battery. The battery is removably attached to the handset to provide power needed to operate the handset. When power is depleted from the battery, it is removed and recharged or replaced with another battery. While a smaller battery may be preferred for convenient transporting of the handset, a smaller sized battery compromises the amount of power that the battery provides to the handset between charges.

A typical handset continuously drains power from the battery when the handset is in standby or is otherwise processing control information associated with a data transfer to the handset. During standby, the handset's processor continually receives and processes packets of control information unique to particular data transfers. The control information may include the identification numbers of the called handset, the calling handset, and the base station that facilitates the transmission between the called handset and the calling handset. Moreover, the control information may identify the attributes or the type of data that is being transmitted. By processing the control information during standby, a handset determines, for example, if the data associated with the control information is valid data that must be processed. Not surprisingly, the processing of control information at the handset's processor draws considerable power from the battery. In turn, this limits the length of time for which a handset can operate with a given battery.

A possible solution to the problem of power consumption is to increase the size of the battery or to carry one or more spare batteries to replace a depleted battery. Both of these options, however, minimize the mobility advantages offered by cellular telephone technology as it increases the size of the handset or the number of components that are needed to operate the handset.

Based on the foregoing, it can be seen that a tension exists between providing a conveniently-sized cellular telephone handset and the desire to reduce power consumption of the handset to increase the period of time between charging.

SUMMARY OF THE INVENTION

The present invention is directed to a circuit arrangement for hardware checking the validity of data transmitted in a SA-field within the traffic channel of the personal handyphone system. The circuit arrangement includes a receiver for receiving control information corresponding to a SA-field, and an interrupt generator for generating an interrupt to activate the handset processor when the control information indicates that the SA-field is the beginning of a series of SA-fields containing valid data.

The present invention is further directed to a method for hardware checking the validity of data transmitted in a SA-field within the traffic channel of the personal handyphone system. The method includes enabling an interrupt generating circuit, receiving a current SA-field having data and control information, generating an interrupt when the control information indicates that the SA-field is the beginning of a series of SA-fields containing valid data, passing the interrupt to the processor, and initiating processing of data in the SA-field at the processor in response to the interrupt.

The above summary of the present invention is not intended to describe each illustrated embodiment or every implementation of the present invention. This is the purpose of the figures and of the detailed description that follow.

BRIEF DESCRIPTION OF THE DRAWINGS

Other aspects and advantages of the invention will become apparent upon reading the following detailed description and upon reference to the drawings in which.

Figure 1:
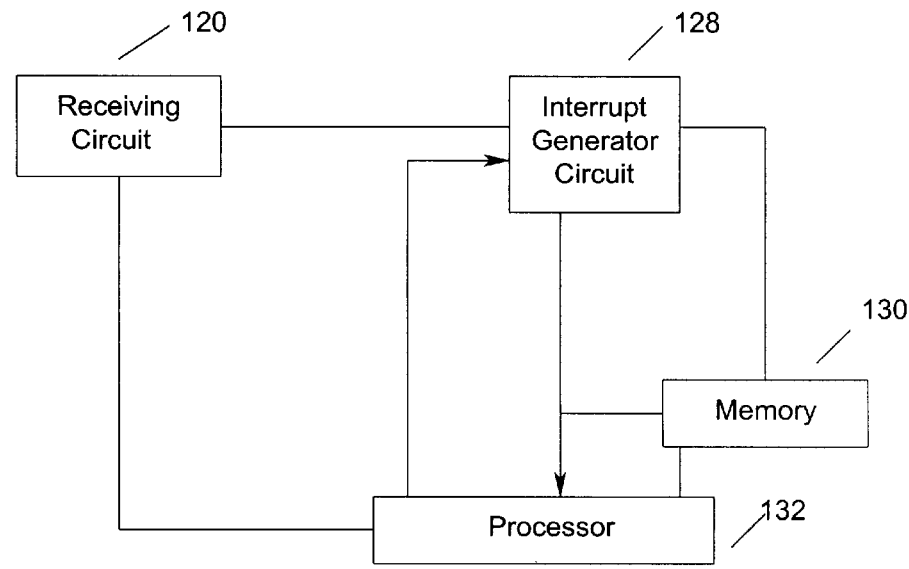
FIG. 1 illustrates an exemplary hardware circuit in a cellular telephone for use in accordance with one embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives fitting within the spirit and scope of the invention as defined by the appended claims.

DESCRIPTION OF THE ILLUSTRATED EMBODIMENTS

In exemplary embodiments of the present invention, a hardware circuit arrangement, apart from the processor, on a cellular telephone handset is configured and arranged to check the validity of Slow Associated Control Channel (SA or SACCH) data. This data builds the layer 2 frame and is transmitted in a series of 16-bit fields each referred to as a SA-field. The first bit of a SA-field identifies the status of the data in the remaining fifteen bits of that field. If the status bit is a "0" the data contained within that SA-field is the start or middle of a valid layer 2 frame. If the status bit is a "1," the data in that SA-field is the end of the layer 2 frame or is invalid as the status bit remains "1" after completion of the layer 2 frame. The hardware circuit arrangement identifies the beginning of a valid layer 2 frame by checking the status bit of the SA-fields. When the hardware circuit detects a status bit having a "0" the circuit arrangement activates the processor to begin processing the layer 2 data contained within the SA-field. Once activated, the processor disables the hardware circuit and processes data contained in subsequent SA-fields for the remainder of the layer 2 frame. After the complete series of SA-fields representing the entire layer 2 frame is received and processed, the processor powers itself down and reactivates the hardware circuit arrangement to check for receipt of the next layer 2 frame.

Checking the validity of data in SA-fields with a hardware circuit arrangement located on the cellular telephone separate from the telephone's processor saves significant power. When the hardware circuit arrangement configured according to the present invention checks the status bit of SA-fields received at the cellular telephone, the processor and the processor's memory are in a low power mode. The processor and its corresponding memory activate (or power up) only after the separate hardware circuit arrangement detects the beginning of a valid layer 2 frame. As such, the processor and its memory are not drawing significant power from the battery during this checking. Since the hardware circuit arrangement requires significantly less power to operate than the processor and its corresponding memory, use of the hardware circuit arrangement instead of the processor to check for the beginning of a valid layer 2 frame during standby provides significantly less drain on the battery.

FIG. 1 illustrates an exemplary system, including a hardware circuit arrangement apart from the processor 132, for checking the validity of data in a SA-field with reduced power consumption in a cellular telephone. The system of FIG. 1 includes receiving circuit 120 which receives a SA-field transmitted within a traffic channel. Receiving circuit 120, which is coupled to interrupt generator circuit 128, passes the SA-field to interrupt generator circuit 128. Interrupt generator circuit 128 is coupled to memory portion 130. Memory portion 130, which may be, for example, a random access memory, stores layer 2 data contained within the SA-field that it receives from interrupt generator circuit 128. It can be appreciated that memory portion 130 may be one or more discrete memory locations in one or more memory units.

Interrupt generator circuit 128 further connects to processor 132. When interrupt generator circuit 128 receives the SA-field from receiving circuit 120, it checks the status bit of the SA-field. If the status bit is a "0," interrupt generator circuit 128 generates and passes an interrupt signal to processor 132. The processor 128 activates in response to the interrupt. Once activated, the processor 132 retrieves the layer 2 data previously stored in memory portion 130 that corresponds to the status bit that initiated generation of the interrupt at interrupt generator circuit 128. The processor 132 then begins to build the layer 2 frame using the data contained within that SA-field.

As further shown in FIG. 1, processor 132 is bidirectionally coupled to interrupt generator circuit 128 and the receiving circuit 120. Once processor 132 receives the interrupt signal from interrupt generator circuit 128 and retrieves the stored data from memory portion 130, the processor 132 disables the interrupt generator circuit 128. The processor 132 then receives directly from the receiving circuit 120 all of the subsequent SA-fields that include the data to build the layer 2 frame. During this time when the interrupt generator circuit 128 is disabled, the processor 132 also checks the status bit of the subsequent SA-fields to identify the end of the layer 2 frame. As explained below, after the processor 132 receives the last SA-field in the layer 2 frame it returns to a lower power mode and reactivates the interrupt generator circuit 128.

The elements of FIG. 1 are typically powered by a power supply (not shown). The power supply may be, for example, a portable battery that removably attaches to the telephone handset.

The system of FIG. 1 may further include an internal timer (not shown). The timer may be programmed to reactivate the interrupt generator circuit 128 and deactivate the processor 132 a predetermined period of time after the processor 132 identifies a SA-field as the end of the layer 2 frame by detecting a "1" as the status bit of a SA-field.

Figure 2:
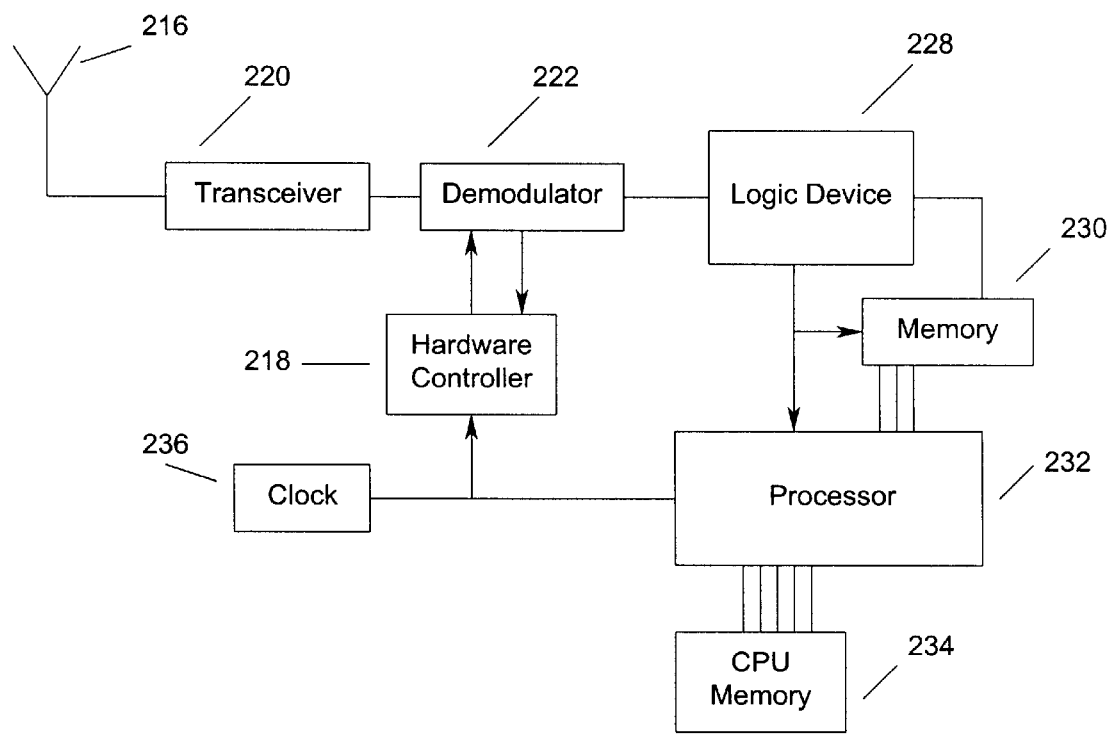
FIG. 2 illustrates another embodiment of a hardware circuit in accordance with the present invention.

FIG. 2 illustrates another embodiment of the present invention in block diagram form. Antenna 216, which receives a SA-field transmitted in the traffic channel, connects to transceiver 220. Transceiver 220 connects to demodulator 222. It should be appreciated that transceiver 220 represents any type of transmitter/receiver arrangement whether incorporating common elements or formed separately. A hardware controller 218 connects to and bidirectionally communicates with the modulator 222. The hardware controller 218 controls the hardware of the system of FIG. 2 in a manner well known in the art. The hardware controller is also bidirectionally connected to processor 232. A SA-field received at antenna 216 passes to transceiver 220 which in turn passes to demodulator 222. The data and the status bit contained within the SA-field then pass to logic device 228 which connects to demodulator 222. The data also passes from the demodulator 222 to another logic device (not shown) that performs protocol related functions. The data contained within the SA-field is stored in memory portion 230 which is coupled to logic device 228.

The logic device 228 functions to check the status bit of the SA-field received from the demodulator 222. In one embodiment, logic device 228 is a NAND-gate. One input to the NAND-gate is a signal having a continuously high status. The other input to the NAND-gate is the status bit from the SA-field received from the demodulator 222. In this embodiment, the status bit controls the output from the logic device 228; when the status bit is a "0," the output is "1," and, conversely, when the status bit is "1," the output is "0." In another embodiment, the logic device 228 may be a NOR-gate. A first input to the NOR-gate is a continuous low signal. The second input to the NOR-gate is the status bit from the SA-field. Again, the status bit dictates the output generated from the NOR-gate. In either implementation when the status bit of the SA-field is a "0" the output signal from the logic device functions as an interrupt which in turn passes to processor 232 having a memory 234. Similarly, the output from logic device 228 connects to memory portion 230. Upon receipt of the interrupt at processor 232, processor 232 changes from a lower power mode to a high power mode and retrieves data stored in memory portion 230 corresponding to the status bit previously checked at logic device 228. Moreover, in response to the interrupt, the processor 232, which is bidirectionally coupled to logic device 228, passes a signal to logic device 228 to deactivate the logic device 228.

The system of FIG. 2 further includes a master clock 236. The master clock 236 connects to hardware controller 218 and processor 232. The master clock 236 is used for general system operations. The clock 236 may be used, for example, in connection with an internal timer (not shown) to reactivate the logic device 228 and to power down the processor 232 a predetermined period of time after the processor 232 detects the end of the layer 2 frame.

Figures 3, 4:
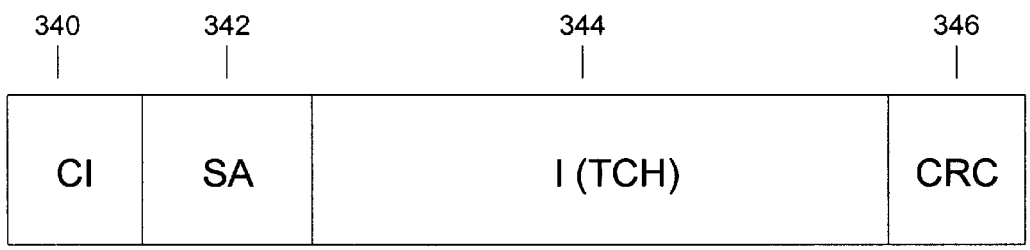
FIG. 3 illustrates the basic physical slots of the traffic channel in a personal handyphone system.
FIG. 4 is a table illustrating how the status of data in a SA-field is determined.

FIG. 3 illustrates the basic physical slots of a traffic channel in a personal handyphone system. This slot structure is uniformly established through the personal handyphone system standard. The "CI" slot location 340 consists of four bits and represents the channel identifier. Slot location "SA" 342 is the 16-bit SA-field that is checked in accordance with the present invention. The first bit in the SA-field is the status bit. The remaining fifteen bits of the SA-field include the data which builds the layer 2 frame. The "I (TCH)" slot location 344 consists of one-hundred sixty bits of coded voice data transmitted within the traffic channel. The "CRC" slot location 346 consists of sixteen bits and represents the cyclic redundancy check.

FIG. 4 is a table that illustrates how the status of data in a present SA-field in a personal handyphone system is determined based on the status bits of the present and previous SA-fields. If the status bit of a SA-field is a "0," the data in that SA-field is the start or middle of a valid layer 2 frame. When the status bit changes from "1" to "0" the data contained in the SA-field having a status bit of "1" is the end of the layer 2 frame. After the end of a data frame, the status bit in succeeding frames remains "1" until the beginning of a new layer 2 frame at which time the status bit of the first SA-field for that frame changes to "0." As such, whenever the first bit of a present SA-field is a "0," the status of the data in that SA-field is valid. This is illustrated in rows 1 and 3 of the table in FIG. 4. When the status bit of the present SA-field is a "1," the data in that field is valid and forms a part of the layer 2 frame when the first bit of the preceding SA-field was a "0." This is illustrated in row 2 of FIG. 4. As illustrated in row 4, when the status bit of the present SA-field is a "1" and the first bit of the prior SA-field is a "1," the data in the present SA-field is invalid. In this example, the status bit of "1" in the prior SA-field indicates that that SA-field was the end of the layer 2 frame. And, the status bit remains at a "1" until the beginning of a new layer 2 frame which is indicated by a status bit having a "0." As such, when two consecutive SA-fields have a status bit that is "1" the data in the second SA-field is invalid.

Figure 5:
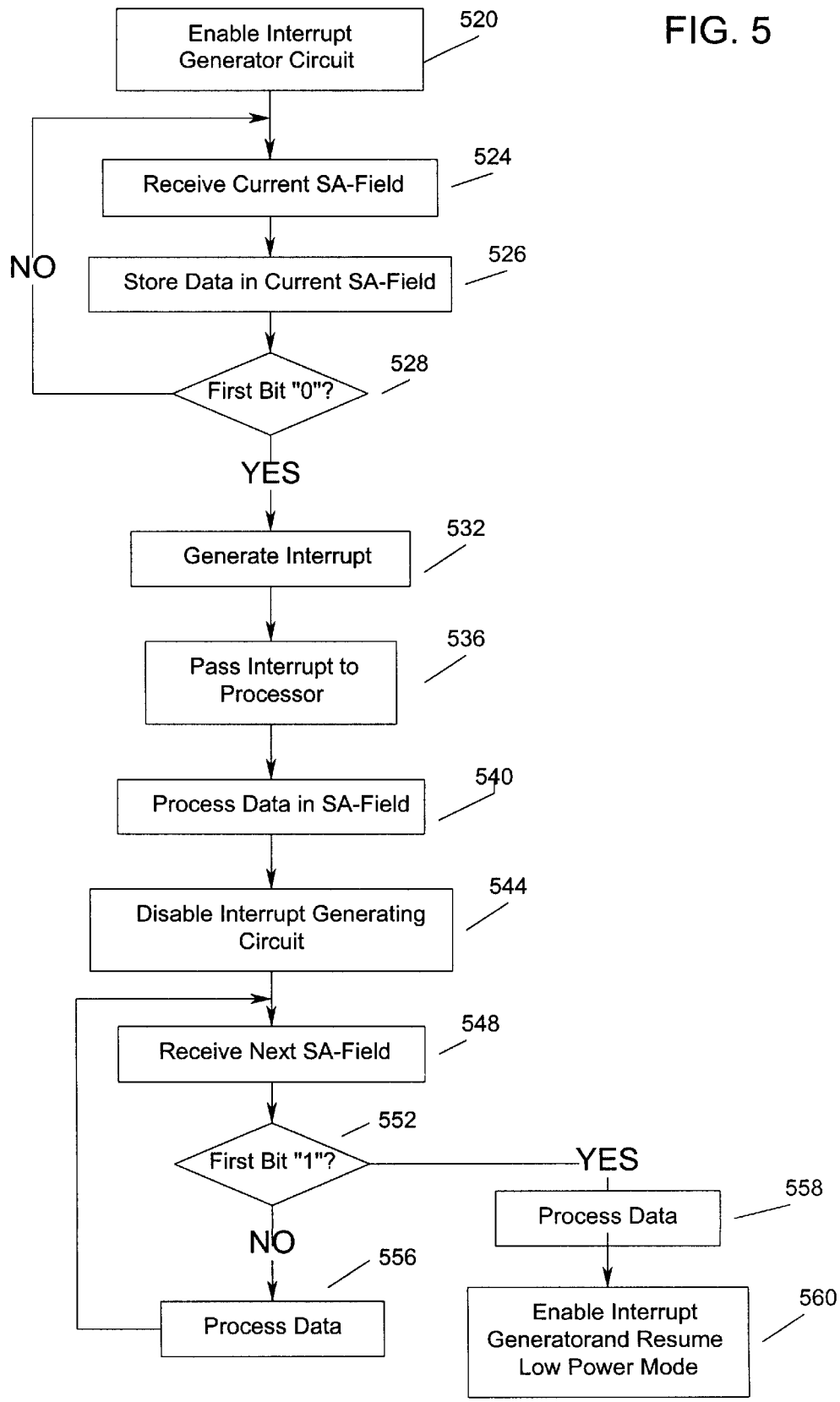
FIG. 5 is a flowchart illustrating exemplary steps, according to the present invention, for checking data transmitted in a personal handyphone system.

FIG. 5 illustrates a method for checking data transmitted in a personal handyphone system according to one embodiment of the present invention. Initially, the interrupt generating circuit is enabled as depicted in block 520. When the interrupt generating circuit is enabled the processor is in a low power mode, thereby preserving power. Subsequently, the cellular telephone receives a current SA-field transmitted within a traffic channel as depicted in block 524. The data contained within the current SA-field is then stored in a memory as shown in block 526.

As illustrated in block 528, the status bit of the SA-field is checked. If the status bit is a "1," the current SA-field is not the beginning of a new valid layer 2 frame. Therefore, the processor remains in a lower power mode, and the hardware circuit of the receiver receives the next SA-field in the traffic channel and checks the status bit of that next SA-field. However, if the status bit of the SA-field is a "0," which indicates that the data within that SA-field is valid and forms a part of a layer 2 frame, an interrupt is generated which passes to the processor as indicated by blocks 532 and 536. The processor, which previously had been in a low power mode, activates (changes to a high power mode) in response to the interrupt. The processor then retrieves the data from the memory location that stores the data when the status bit is checked and processes data in that SA-field as indicated by block 540.

Once the processor is activated, the processor disables the interrupt generating circuit as illustrated by block 544. The processor, in response to the interrupt, passes a signal to the interrupt generating circuit which disables the interrupt generating circuit.

The next SA-field is then received at the telephone as shown in block 548. Since the interrupt generating circuit is disabled, the next SA-field is received at the telephone receiver and passes directly to the processor.

Once the next SA-field is received at the processor, the processor checks the status bit as shown in block 552. If the status bit is a "0," the SA-field corresponding to the checked status bit is the middle of a valid layer 2 frame. Therefore, as shown in block 556 the processor processes the data in that SA-field and receives the subsequent SA-field. However, if the status bit in the SA-field is a "1," which indicates that that particular SA-field is the end of the layer 2 frame, the processor processes the data, returns to a lower power mode and enables the interrupt generator circuit as illustrated in blocks 558 and 560.

The steps in block 560 occur, for example, a predetermined period of time after the processor processes data in the SA-field corresponding to the end of the layer 2 frame. The interrupt generating circuit is enabled in order to detect the beginning of a new layer 2 frame. Subsequent SA-fields are received at the telephone receiver and pass to the interrupt generator circuit for checking. As such, the checking of the status bit of subsequent SA-fields is transferred from the processor to the interrupt generating circuit. The processor remains in a low power mode until the beginning of the next valid layer 2 frame received at the handset.

As noted, the present invention is applicable to an apparatus and method for hardware checking the validity of data in a SA-field transmitted within a traffic channel of a personal handyphone system. Accordingly, the present invention should not be considered limited to the particular examples described above, but rather should be understood to cover all aspects of the invention as fairly set out in the attached claims. Various modifications, equivalent processes as well as numerous communication devices to which the present invention will be applicable will be readily apparent to those of skill in the art upon review of the present specification. The claims are intended to cover such modifications and devices.

We claim:

1. A cellular telephone for operating in a personal handyphone system, the telephone comprising:

a receiver for receiving coded voice data transmitted in a frame, the frame having control information indicating a first or second state, the first state indicating one of a leading frame and a middle frame in a series of frames, the second state indicating the frame is one of an end frame and an undivided frame;

a circuit arrangement coupled to the receiver and having an interrupt generator, the interrupt generator having an input to receive control information in the frame, wherein an interrupt is generated responsive to the control information in the frame in the first state;

a processor coupled to the interrupt generator to receive the interrupt, and transition from a lower power mode to a high power mode to process data in the frame in response to the interrupt; and a portable power supply coupled to the processor and the interrupt generator.

2. A cellular telephone according to claim 1, wherein the interrupt generator receives a disabling signal from the processor after the interrupt is generated.

3. A cellular telephone according to claim 2, wherein the processor is configured and arranged to provide an enabling signal to the interrupt generator after processing an end frame as indicated by the control information in the second state.

4. A cellular telephone according to claim 1, wherein the interrupt generator includes a logic device having a first input to receive the control information from the frame and an output indicating a high or low state, wherein the output is the high state when the control information is the first state and the output is the low state when the control information is the second state.

5. A cellular telephone according to claim 4, wherein the logic device is a NAND-gate.

6. A cellular telephone according to claim 4, wherein the logic device is an NOR-gate.

7. A cellular telephone according to claim 4, further comprising a timer coupled to the processor, and configured and arranged to reactivate the interrupt generator and deactivate the processor a predetermined period of time after the processor processes an end frame as indicated by the control information in the second state.

8. A cellular telephone according to claim 1, wherein the processor is configured and arranged to transition from the high power mode to the low power mode after processing an end frame as indicated by the control information in the second state.

9. A cellular telephone according to claim 8, wherein the processor is configured and arranged to provide an enabling signal to the interrupt generator after processing an end frame as indicated by the control information in the second state.

10. A cellular telephone according to claim 1, wherein the control information is defined in a bit of a slow associated control channel field of the personal handy phone system standard.

11. A method for checking data transmitted in a personal handyphone system in which coded voice data is transmitted in a series of frames to a portable station having a circuit arrangement for selectively passing data in the frames to a processor for processing, each transmitted frame having control information indicating a first or second state, the first state indicating one of leading frame and a middle frame in the series of frames, the second state indicating the frame is one of an end frame and an undivided frame, the method comprising:

enabling an interrupt generating circuit;

receiving a current frame having data and control information;

generating an interrupt signal by the interrupt generating circuit when the control information of the current frame is the first state;

passing the interrupt signal to the processor;

transitioning the processor from a low power mode to a high power mode in response to the interrupt signal; and initiating processing of the data in the current frame in response to the interrupt.

12. A method according to claim 12, further comprising disabling the interrupt generating circuit after generating the interrupt signal.

13. A method according to claim 12, further comprising monitoring the control information of at least one succeeding frame with the processor after the interrupt is generated.

14. A method according to claim 13, further comprising enabling the interrupt generating circuit when the processor detects an end frame of the series of frames.

15. A method according to claim 14, further comprising deactivating the processor a predetermined period of time after detecting the end frame of the series of frames.

16. A method according to claim 14, further comprising transitioning the processor from the high power mode to the lower power mode after processing the end frame.

* * * * *

UNITED STATES PATENT AND TRADEMARK OFFICE
CERTIFICATE OF CORRECTION

PATENT NO. : 5,903,828
DATED : May 11, 1999
INVENTOR(S) : Martin, et. al.

It is certified that error appears in the above-indentified patent and that said Letters Patent is hereby corrected as shown below:

Column 8, line 25, Claim 12, delete "12" and insert --11--.

Signed and Sealed this

Nineteenth Day of October, 1999

Q. TODD DICKINSON

Attest:

Attesting Officer

Acting Commissioner of Patents and Trademarks